(No Model.)
C. GORDON.
LAMP BURNER.
No. 267,075. Patented Nov. 7, 1882.
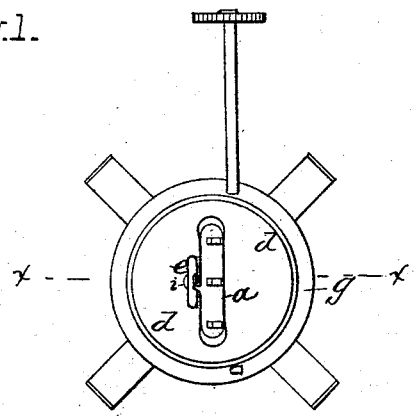
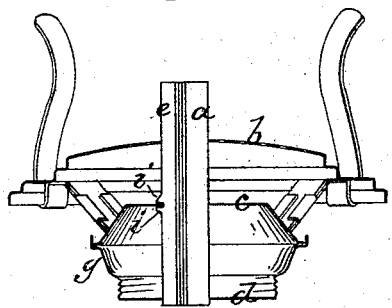
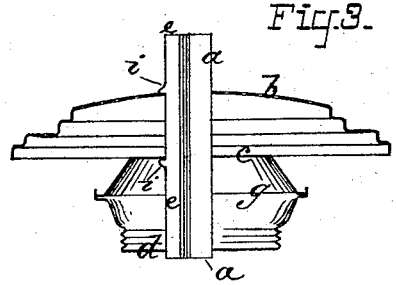
ATTEST:
J. A. Hurdle.
Jacob Felbel
INVENTOR:
Chas Gordon
by atty. J. N. McIntire

UNITED STATES PATENT OFFICE.

CHARLES GORDON, OF CLEVELAND, OHIO.

LAMP-BURNER.

SPECIFICATION forming part of Letters Patent No. 267,075, dated November 7, 1882.

Application filed September 6, 1882. (No model.)

*To all whom it may concern:*

Be it known that I, CHARLES GORDON, of Cleveland, in the county of Cuyahoga and State of Ohio, have invented certain new and useful Improvements in Lamp-Burners; and I do hereby declare that the following is a full, clear, and exact description thereof, reference being had to the accompanying drawings, making part of this application.

Previous to my invention it has been customary, in the manufacture of that kind of lamp-burners in which is employed a gas-tube arranged or located alongside of and close to the wick-tube, to hold or effect the retention in place of such gas-tube by soldering it at or near its lower end to the lower part of the wick-tube, or to the base of that part of the burner which is screwed into the mouth or opening of the oil-reservoir of the lamp, or to both of these portions of the lamp-burner, in a manner well understood by those familiar with the manufacture of burners. This mode or method of securement is not only comparatively laborious and expensive, but it gives to the manufactured article a botchy or unfinished appearence where the solder is applied. Furthermore, it is not a perfectly positive and enduring mode of securement together of the parts.

As is well known to those skilled in the art of manufacturing lamp-burners, it is now common to secure the flattened wick-tube in place by means of projections at different points on opposite sides or edges of the tube, (swaged out or otherwise formed,) which engage or interlock with the disk-like portions of the burner through which said wick-tube passes, and thus prevent any movement of the tube endwise relatively to the said disk-like portions. In the fastening together thus of the wick-tube and disk-like devices one set of the projections thrown out from the tube has to be formed after the tube shall have been placed in position in the perforations made in said disks for its accommodation, and this one set is usually formed at the lower end of the wick-tube in a manner well understood. This same mode of attachment to the disks (in the manner just alluded to) cannot, however, be practiced with reference to the fastening of the gas-tube to said disks, or to any one of them, because of the smallness of said tube, which renders impracticable the swaging or upsetting of the stock of the gas-tube after the latter shall have been put in place; but I have succeeded in securing the gas-tube in place without any soldering by the expedient of providing the gas-tube with projections which will engage with some one or more of the disk-like portions or devices through which said tube has to pass, and then placing said gas-tube in place, so as to interlock endwise with said disk or disks previous to the insertion within the aperture of the disk of the wick-tube. In this manner I am enabled by the subsequent insertion of the wick-tube and the fastening of the latter in place in the known manner to hold the gas-tube laterally, and so that its projections will operate to then hold it longitudinally relatively to the disks.

To enable those skilled in the art to better understand and to practice my invention, I will now proceed to more fully explain it, referring by letters to the accompanying drawings, forming part of this specification, and in which—

Figure 1 is a bottom view of an ordinary kerosene-lamp burner embodying my invention. Fig. 2 is a vertical section at the line *x x* of Fig. 1. Fig. 3 is a similar sectional view, showing a modification of the invention, to be presently explained.

In the several figures the same part will be found designated by the same letter of reference.

*a* is the usual wick-tube, passing downwardly through the perforated disk *b*, and thence through the top and bottom disk-like portions, *c* and *d*, of the portion *g* of the burner, and being secured against movement endwise within the perforations of disks *c* and *d* by projections which overhang the disk *c* and the swaged-out lower end projections that underlie the disk *d*, all in the usual and well-known manner.

*e* is the gas-tube, which is made and arranged relatively to the wick-tube and the disks *b*, *c*, and *d* in about the usual manner, except that instead of being held in its place longitudinally by soldering, as heretofore, it is interlocked endwise with one or another of the disks of the fixture by means of projections *i*, one of which overlies and the other of which underlies one or another of said disks, as shown, In the form of gas-tube attachment seen at Figs. 1 and 2 these projections $i$ engage with the disk $c$, while in the modification of my invention shown at Fig. 3 said projections, it will be seen, engage with the perforated disk-like device $b$ of the burner. It will be understood that the projections $i$ are formed on or applied to the tube $e$ before its application to the burner, and that said tube is applied by inserting it endwise in the larger perforations made in the disks for the accommodation of the wick-tube; that said tube $e$ is then moved laterally into its proper position, and that the wick-tube $a$ is thereafter put in place endwise and fastened, as usual, the wick-tube thus holding the tube $e$ permanently in an interlocked condition with the disk $c$, in the case shown at Figs. 1 and 2, and with the disk $b$, in the case illustrated at Fig. 3. Of course, if deemed expedient, substantially the same result may be accomplished through the same mechanical means by arranging the projections $i$ so that instead of both interlocking with some one of the disks through which tube $e$ has to pass, one of them shall overlie one of said disks and the other shall underlie some other one of said disks. For an instance, if the upper one of the projections $i$ should overlie the disk $c$ and the other one should be so located on tube $e$ as either to underlie the disk $b$ or to underlie the disk $d$, the same result would be secured as by arranging the said projections to operate on some one only of the several disks.

In practicing my invention so far I have found it best to form the engaging projections or lugs $i$ by striking them up, as shown, which is conveniently and cheaply done by a tool which is easily inserted between the slightly-separated parallel edges of the sheet of metal composing tube $e$ before the latter is applied to the burner; but it will be understood, of course, that any other sort of projecting devices formed in any other manner—as, for instance, by cutting the side of tube $e$ and turning outwardly two minute lips—may be adopted without departing from my invention, the gist of which will be seen to rest in having the gas-tube made with two projections adapted to be interlocked with some one or more of the disk-like portions of the burner when the said tube shall be applied to the burner, and in having the gas-tube, after its application to the burner, secured laterally in place by the wick-tube.

What I claim as new, and desire to secure by Letters Patent, is—

1. A gas-tube for lamp-burners, made with projections, in the manner described, and adapted to be inserted endwise into an aperture large enough to accommodate it, with its said projections, and to be subsequently interlocked endwise with one or more of the disk-like portions of the burner by lateral movement of the tube, as set forth.

2. In combination with the wick-tube and the perforated disk-like portions of the burner through which said tube passes, a gas-tube formed or provided with laterally-projecting devices, which engage with some one or more of the disks through which said gas-tube passes to hold the latter in place endwise when it and the wick-tube are in place, as set forth.

In witness whereof I have hereunto set my hand this 5th day of September, 1882.

CHARLES GORDON.

In presence of—
JACOB FELBEL,
ROBERT BLISSERT.